US008595731B2

(12) United States Patent
Bose et al.

(10) Patent No.: US 8,595,731 B2
(45) Date of Patent: Nov. 26, 2013

(54) LOW OVERHEAD DYNAMIC THERMAL MANAGEMENT IN MANY-CORE CLUSTER ARCHITECTURE

(75) Inventors: Pradip Bose, Yorktown Heights, NY (US); Philip G. Emma, Yorktown Heights, NY (US); Eren Kursun, Yorktown Heights, NY (US); Jude A. Rivers, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 12/698,545

(22) Filed: Feb. 2, 2010

(65) Prior Publication Data

US 2011/0191776 A1    Aug. 4, 2011

(51) Int. Cl.
*G06F 9/46*   (2006.01)
*G06F 9/44*   (2006.01)

(52) U.S. Cl.
USPC ................................. 718/102; 712/220

(58) Field of Classification Search
USPC .......................... 718/102; 712/220
See application file for complete search history.

(56) References Cited

U.S. PATENT DOCUMENTS

| 6,078,944 | A  | * | 6/2000  | Enko et al. ............... 718/105 |
| 6,804,632 | B2 | * | 10/2004 | Orenstien et al. .......... 702/188 |
| 7,961,034 | B2 | * | 6/2011  | Konstadinidis ............ 327/535 |
| 2009/0121737 | A1 | * | 5/2009 | Yuan et al. ................. 324/763 |
| 2011/0055838 | A1 | * | 3/2011 | Moyes ....................... 718/102 |

* cited by examiner

*Primary Examiner* — Abdullah Al Kawsar
*Assistant Examiner* — Blake Kumabe
(74) *Attorney, Agent, or Firm* — Scully, Scott, Murphy & Presser, P.C.; Gail H. Zarick, Esq.

(57) ABSTRACT

A semiconductor chip includes a plurality of multi-core clusters each including a plurality of cores and a cluster controller unit. Each cluster controller unit is configured to control thread assignment within the multi-core cluster to which it belongs. The cluster controller unit monitors various parameters measured in the plurality of cores within the multi-core cluster to estimate the computational demand of each thread that runs in the cores. The cluster controller unit may reassign the threads within the multi-core cluster based on the estimated computational demand of the threads and transmit a signal to an upper-level software manager that controls the thread assignment across the semiconductor chip. When an acceptable solution to thread assignment cannot be achieved by shuffling of threads within the multi-core cluster, the cluster controller unit may also report inability to solve thread assignment to the upper-level software manager to request a system level solution.

24 Claims, 5 Drawing Sheets

LOW OVERHEAD DYNAMIC THERMAL MANAGEMENT IN MANY-CORE CLUSTER ARCHITECTURE

BACKGROUND

The present invention generally relates to semiconductor structures, and particularly to a semiconductor chip employing multi-core cluster architecture having a capability for dynamic thermal management of cores and methods of operating the same.

A multi-core processor is a processing system including two or more independent cores (or CPUs). The cores are typically integrated onto a single integrated circuit die (known as a chip multiprocessor or CMP) in a semiconductor chip, or they may be integrated onto multiple dies in a single semiconductor chip package. A many-core processor is one in which the number of cores is large enough that traditional multi-processor techniques are no longer efficient and likely requires a network on chip. Typically, the threshold for a many-core processor is in the range of several tens of cores.

In a many-core processor, software-level thermal management becomes increasingly complex and costly as the number of cores increases in each cluster and the total number of clusters increases in a semiconductor chip. This is because overhead built into software techniques based on thread profiling and assignment rises non-linearly with the number of cores. The software for managing the threads performs thread profiling, maintaining of thread history, and combining of threads. The rapid increase in the complexity of the software algorithm with the number of cores and clusters makes it difficult to manage in a semiconductor chip having a large number of multi-core clusters.

Thermal management of multi-core clusters in a semiconductor chip having multiple clusters becomes paramount in order to maintain the performance of a semiconductor chip at an optimal level. Because of the difficulty in managing thermal profile of cores in a multi-core multi-cluster semiconductor chip, however, currently available software-based thermal management schemes face challenges in providing an optimal level performance for semiconductor chips with a large number of cores.

BRIEF SUMMARY

According to an aspect of the present invention, a multi-core processor chip includes at least one cluster of processor cores. Each of the at least one cluster includes a plurality of processor cores and a cluster controller unit that is configured to perform program instructions. The program instructions configure the controller unit to perform the steps of determining threads in a first processor core within a cluster that includes multiple processor cores; performing temporary reassignment of each of the threads in the first processor core to a second processor core within the cluster; during each of the temporary reassignment of the threads, generating data relating to core performance in the first processor core; and estimating computational demand for each of the threads in the first processor core based on the data on core performance.

According to another aspect of the present invention, a method of operating a multi-core processor chip is provided. The method includes: providing a multi-core processor chip including at least one cluster of processor cores, wherein each of the at least one cluster includes a plurality of processor cores and a cluster controller unit; identifying threads in a first processor core within a cluster that includes multiple processor cores; performing temporary reassignment of each of the threads in the first processor core to a second processor core within the cluster; during each of the temporary reassignment of the threads, generating data relating to core performance in the first processor core; and estimating computational demand for each of the threads in the first processor core based on the data on core performance.

In an embodiment of the present invention, a semiconductor chip includes a plurality of multi-core clusters each including a plurality of cores and a cluster controller unit. Each cluster controller unit is configured to control thread assignment within the multi-core cluster to which it belongs. The cluster controller unit monitors various parameters measured in the plurality of cores within the multi-core cluster to estimate the computational demand of each thread that runs in the cores. The cluster controller unit may reassign the threads within the multi-core cluster based on the estimated computational demand of the threads and transmit a signal to an upper-level software manager that controls the thread assignment across the semiconductor chip. When an acceptable solution to thread assignment cannot be achieved by shuffling of threads within the multi-core cluster, the cluster controller unit may also report inability to solve thread assignment to the upper-level software manager to request a system level solution.

DETAILED DESCRIPTION

As stated above, the present invention relates to a semiconductor chip employing multi-core cluster architecture having a capability for dynamic thermal management of cores and methods of operating the same, which are now described in detail with accompanying figures.

As used herein, a "semiconductor chip" refers to all of the elements within a single semiconductor chip package that includes a single semiconductor die or a plurality of electrically connected semiconductor dies.

As used herein, a "core" or a "processor core" is a central processing unit that can perform a computer program.

As used herein, a "multi-core processor chip" or a "multi-core chip" refers to a semiconductor chip that includes a plurality of processor cores therein.

As used herein, a "cache" is a hardware configured to store a collection of data duplicating original values stored elsewhere or computed earlier, where the original data takes a longer time to fetch or to compute. A cache is typically employed for rapid access to the data therein.

As used herein, a "cluster" is a set of multiple processor cores that shares the same cache. A semiconductor chip may include multiple clusters, each having multiple processor cores. A cluster is also referred to as a "node" in the art. A cluster may, or may not, include a plurality of "sub-clusters" which have a cache that is shared only among the sub-clusters within that cluster. A cluster may be implemented as a group of processor cores located on the same board, or as a group of three-dimensionally packaged processor cores.

As used herein, a "thread" is a sequence of instructions which may be performed in parallel with other threads in a single processor core.

Figure 1A:
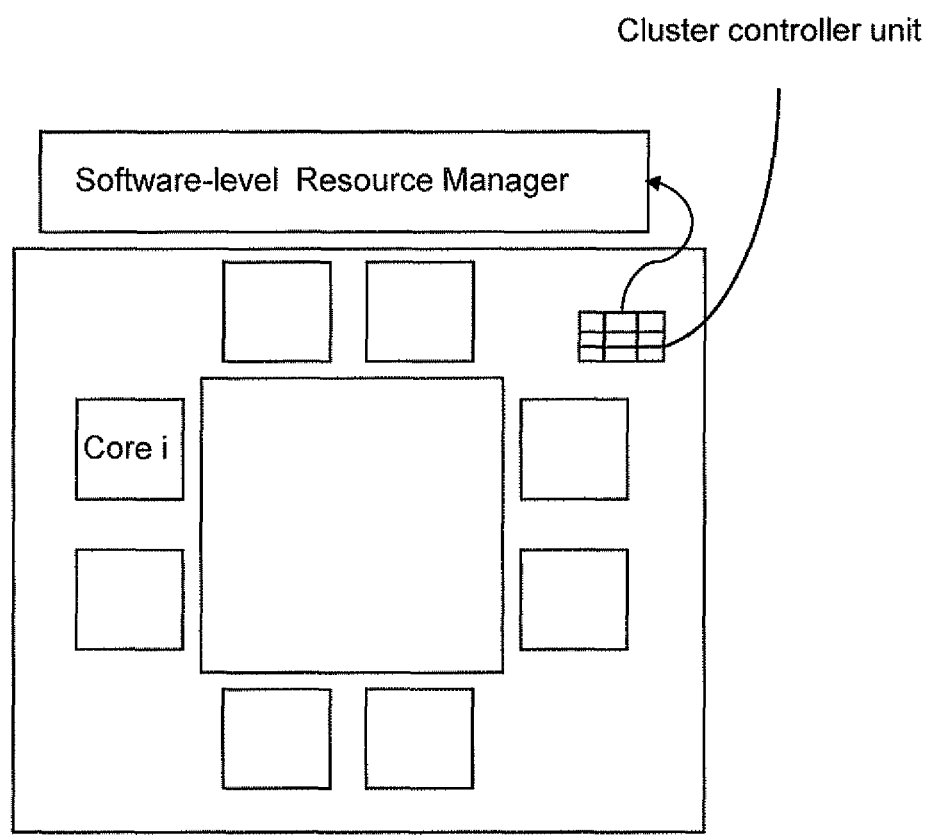
FIG. 1A is a schematic representation of an exemplary cluster including multiple processor cores while core i is running multiple threads.

Referring to FIG. 1A, an exemplary cluster according to an embodiment of the present invention includes eight processor cores. The exemplary cluster may be combined with a plurality of other clusters, each having multiple processor cores, to form a semiconductor chip. The exemplary cluster includes a cluster control unit, which is a hardware device that may include a finite state machine (FSM) and a cluster table. A finite state machine herein means a hardware component configured to store information as to which state among a finite number of states a system is in. The finite state machine represents the state of the exemplary cluster as one among a finite number of states that characterizes all possible states of the exemplary cluster. The finite state machine is embodied in a hardware component that includes multiple semiconductor components including memory modules and at least one processor. The cluster table identifies and keeps track of thread numbers, i.e., the numbers that identify each thread being run within each processor core, for all threads within the exemplary cluster. The cluster table does not need to keep track of the contents of the threads in the exemplary cluster as long as the location of each thread in the exemplary cluster is identified. Information regarding the location of each thread is transmitted to a software-level resource manager, which keeps track of the contents of each thread in all clusters of the semiconductor chip including the exemplary cluster.

The processor cores in the exemplary cluster may heat up at different rates because the computational demand for each thread may be different. A processor core that is initially assigned with threads with high computational demand may heat up excessively, thereby reducing the computational power of the processor core and exacerbating the heating problem. In an illustrative example, core i may be running multiple threads that have high computational demand so that core i heats up excessively.

Figure 1B:
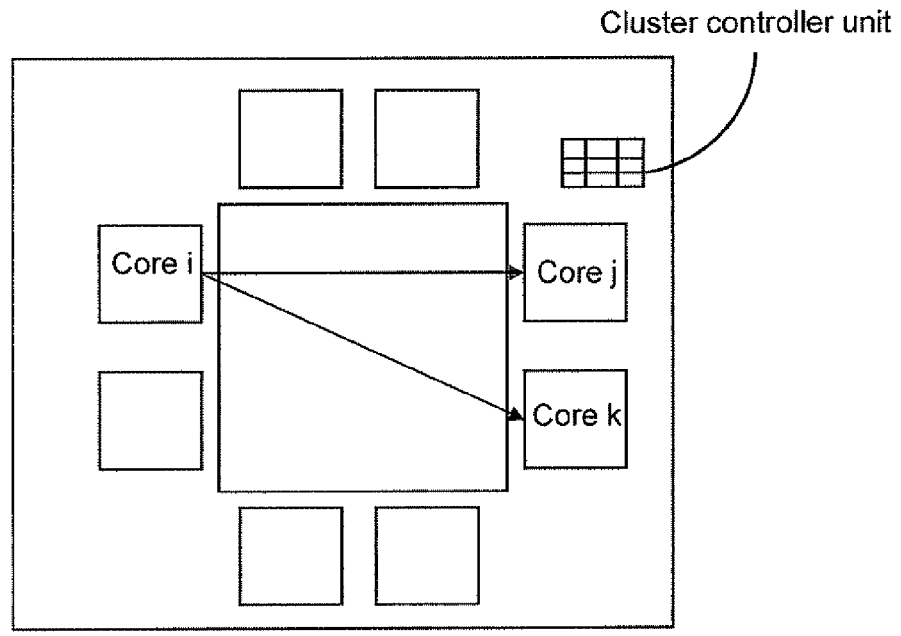
FIG. 1B is a schematic representation of the exemplary cluster including multiple processor cores as threads are transferred from core i to core j and core k.

Referring to FIG. 1B, at least one thread with a high computational demand is identified in processor cores that generates excessive heat. In general, the computational demand of each thread may be estimated in the exemplary cluster by employing methods to be described below. Once at least one thread with a high computational demand is identified in a processor core that heats up excessively, such a thread or such threads may be transferred to another core to alleviate the total computational demand on the processor core. Alternatively, a thread or threads with a high computational demand may be exchanged with another thread or other threads in a different processor core that has a lower computational demand to alleviate the heating of the processor core. In an illustrative example, threads are transferred from core i to core j and core k. Because all processor cores in the cluster share the same cache, the thread transfer is seamless.

Figure 1C:
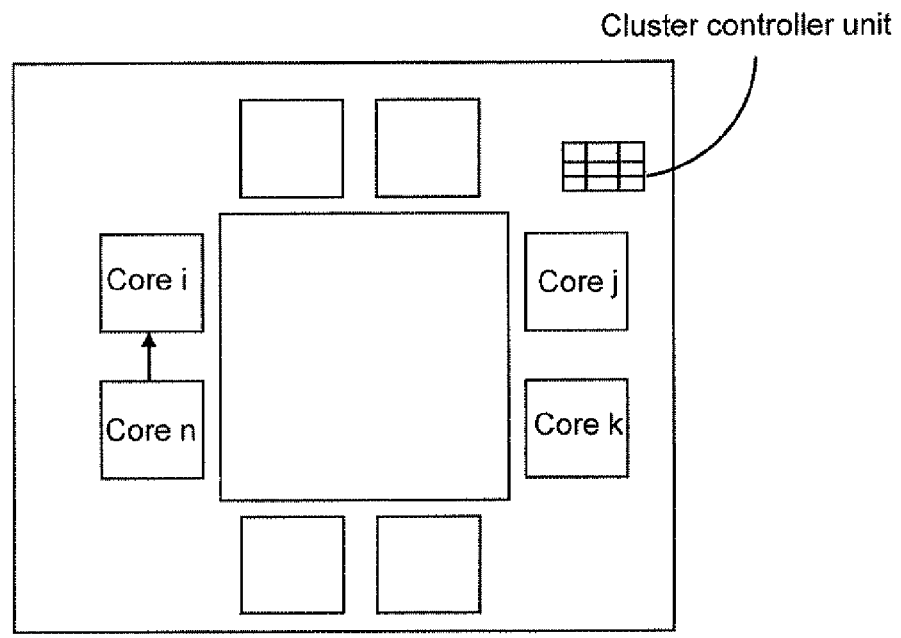
FIG. 1C is a schematic representation of the exemplary cluster including multiple processor cores while a thread is transferred from core n to core i.

Referring to FIG. 1C, further thread transfers may be effected to optimize the performance of the exemplary cluster. In an illustrative example, core i may maintain a low temperature after the transfer of threads to core j and core k as in FIG. 1B. If core n heats up afterwards, a thread with a high computational demand may be identified in core n and subsequently transferred to core i to alleviate the heating of core n. Thus, by transferring and/or exchanging threads among the processor cores in the exemplary cluster, the total computational power of the cluster remains maximized through the operation of the exemplary cluster.

A multi-core processor chip according to an embodiment of the present invention includes at least one cluster of processor cores, and preferably a plurality of clusters. Each cluster includes a plurality of processor cores that share a cache. Threads in a cluster are managed by a cluster controller unit in a manner that is transparent to a software manager that manages allocation of threads to each cluster in the semiconductor chip. Once threads are assigned to a cluster, the threads are distributed to the multiple processor cores within the cluster. The initial assignment of threads to the multiple processor cores within the cluster may be effected autonomously at a cluster controller unit level and the information on the thread assignment may be reported to the software manager, or may be effected by the software manager and the information on the thread assignment may be transmitted from the software manage to the cluster controller unit. Upon initial assignment of the threads to the processor cores, the cluster controller unit is primarily responsible for determining the thread re-assignment within each cluster.

Threads within each cluster are managed dynamically be re-assigning the threads within the cluster that may share the same cache such that the temperature of each processor core remains within a predetermined range. In one exemplary embodiment, thread re-assignment is determined at a cluster level and the software manager is not called upon to make decisions on thread re-assignment absent an overriding exceptional circumstances. In this case, the overhead for managing the threads in each cluster is minimal at the level of the software manager.

The method of an embodiment of the present invention is a hierarchical dynamic thermal management (DTM) that provides thermal management at two separate levels. At a lower level, cluster level thermal management is provided by cluster controller units. At an upper level, software level thermal management is provided by a software manager program, which is called upon only when cluster level thermal management does not provide a solution that maintains performance parameters of each processor core, such as temperature of each processor core, within predefined limits.

Each of the at least one cluster includes a plurality of processor cores and a cluster controller unit. The cluster controller unit is configured to perform a dynamic thermal management program. Each processor core includes at least one temperature sensor and at least one utilization counter. The at least one temperature sensor and the at least one utilization counter in each processor core generates data relating to performance of the processor core during each temporary reassignment of the threads.

The temperature of each processor core is measured employing the at least one temperature sensor. Each of the at least one temperature sensor may be any device that measures local temperature of the processor core, and may be a single diode or a macro including a plurality of interconnected semiconductor devices that are configured to sense temperature.

The at least one utilization counter generates the data relating to performance of devices in the process cores. For example, a utilization counter may generate a value derived from performance of devices in the process cores. Each of the at least one utilization counters may include at least one of a ring-oscillator sensor, a negative-bias temperature instability (NBTI) sensor, or at least another device configured to measure performance degradation of a representative semiconductor device, such as a field effect transistor or a bipolar transistor. The ring-oscillator sensor determines a signal propagation speed in a ring oscillator circuit. The NBTI sensor measures a shift in threshold voltage in transistors.

Each cluster is provided with a built-in cluster control unit, which includes a finite state machine (FSM) and a cluster table. The thermal characteristic of each cluster is characterized by a state in the finite state machine within that cluster. The location of each thread within a core in a cluster is identified by the cluster table, which keeps track of thread numbers for each thread within a core in the cluster. Each cluster functions as an autonomous thermal management unit. The cache shared by the processor cores in a cluster may be configured as a cache hierarchy including, for example, an L1 cache, an L2 cache, or an L3 cache. Typically, the cache shared by the processor cores in a cluster is an L2 cache or an L3 cache.

Figure 2:
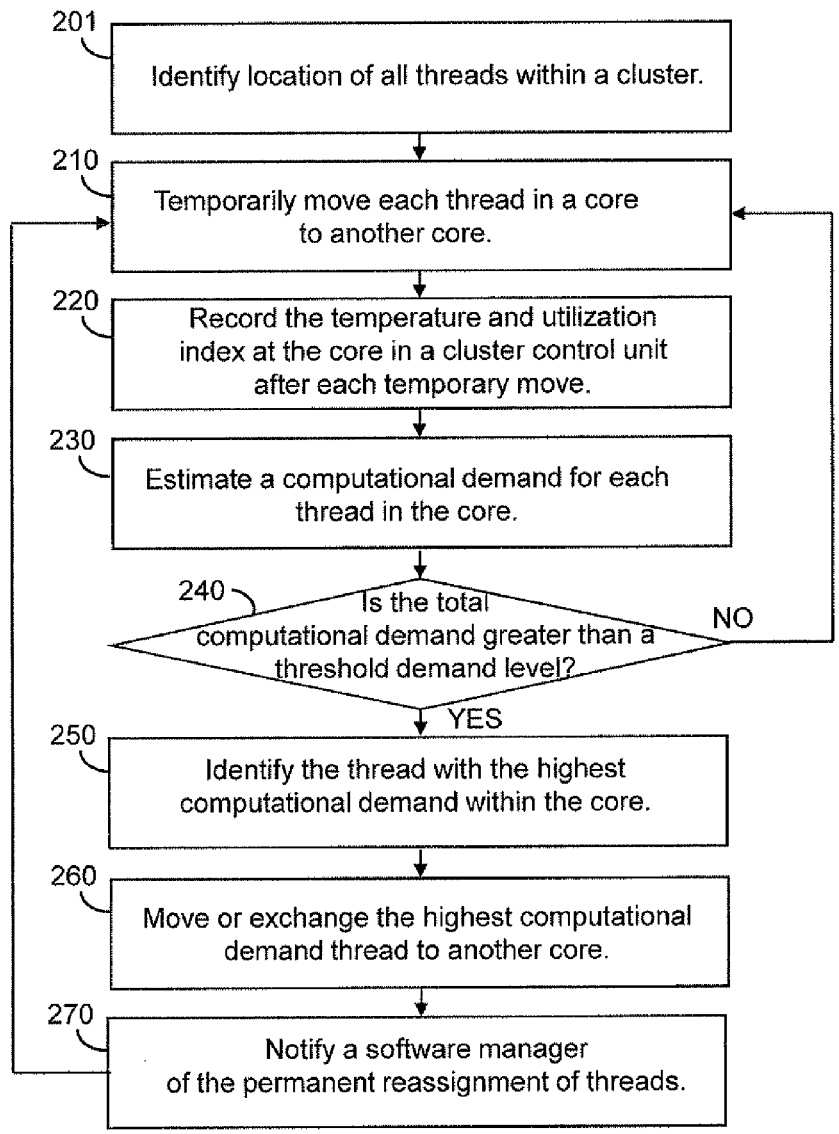
FIG. 2 is a first flow chart illustrating the steps of a first exemplary program executable by a cluster controller unit according to an embodiment of the present invention.

Referring to FIG. 2, a first flow chart illustrates the steps of a first exemplary program executable by a cluster controller unit according to an embodiment of the present invention. While execution of the first exemplary program within a single cluster is described herein, the first exemplary program may be performed at every cluster of a multi-core semiconductor chip.

Referring to step 201, location of all threads within a cluster is identified within a cluster that includes multiple processor cores. For example, all threads within a cluster are identified by a unique identification label, and all possible thread locations in each processor core in the cluster are also identified and tabulated. The location of each thread and the corresponding identification label are tabulated to enable tracking of the location of all threads within the cluster.

Referring to step 210, each thread in a processor core is sequentially transferred, or moved, to another processor core temporarily. For a permanent migration, the threads are migrated similar to activity migration. In the first stage, the thread tables at the cluster-level are updated, indicating where the thread is assigned to. Next, the state is copied to the destination core/cluster. For a permanent migration, the algorithm evaluates the impact of migrating to and from specific cores. For this it does not only look at the thermal profile impact, but wear-out characteristics as well. If the destination core is already close to a spilling threshold itself and has exhibited wear-out related problems, the algorithm doesn't migrate to that core.

The length of a temporary assignment is system specific and is guided by off-line simulations at design time—based on the following factors: (a) time constants with which one can observe a heating or cooling behavior (caused by the migrated thread), and (b) complexity of the design space. This process takes longer when the cores are heavily multi-threaded and the threads exhibit thermal variation. In both cases the lower bound is in the order of 100s microseconds or milliseconds.

As used herein, a transfer of a thread is temporary if a reverse transfer of the same thread follows a transfer of a thread. For example, if a thread in a first processor core is transferred to a second processor core within the same cluster "temporarily," a reverse transfer of the thread from the second processor core to the first processor core subsequently follows the initial transfer from the first processor core to the second processor core. Thus, a temporarily transferred thread, i.e., a temporarily moved thread, is transferred back to the original thread location. The cluster control unit that includes the first and second processor core keeps track of each temporary thread transfer.

Such temporary thread transfer, i.e., temporary thread reassignment, is sequentially repeated for each thread in a processor core. Further, such temporary thread transfer may be performed for all threads within the cluster by performing temporary thread reassignment on all processor cores within the cluster. The unit of the thread reassignment, which is also referred to as thread transfer or thread migration, is a cluster. The thread reassignment is performed at the cluster level within each cluster of a multi-core semiconductor chip without involving any software manager. There is no additional computational demand on the hardware device, or a processing unit, that performs the program of the software manager. Migration overhead, i.e., the overhead that thread migration requires, in the computational power of the cluster is minimal because cache is shared among all processor cores in the cluster.

A temporary reassignment of threads may be effected by a transfer and a reverse-transfer of a thread at a processor core during which a thread location corresponding to the temporarily transferred thread remains empty, i.e., does not run any other thread. Alternatively, a temporary reassignment of threads may be effected by a temporary exchange of threads, i.e., a transfer and a reverse-transfer of a thread at a processor core during which a thread location corresponding to the temporarily transferred thread runs another thread that is transferred from another processor core in the same cluster. Because the thread profiling, i.e., keeping track of the location of the threads in the clusters, is performed at the cluster level, thread profiling at the software manager level is not required during the temporary reassignment of threads.

Referring to step 220, during each of the temporary reassignment of the threads, the cluster controller unit collects data that represents the level of utilization of the processor core on which the temporary thread reassignment is performed. Such collected data may include the temperature of the processor core during the temporary reassignment. The temperature of a processor core may be measured by a temperature sensor in the processor core. The temperature at the processor cores may be recorded in the cluster control unit after each temporary reassignment of threads. Alternately or additionally, such utilization level data may include at least one value for each utilization counter associated with the processor core, i.e., at least one utilization index.

A utilization index is representative of the overall utilization level of a processor core, and may be a function of average temperature of the processor core over time and the duration of the time interval above which the temperature of the processor core exceeds a predefined threshold temperature. In this case, the utilization counter keeps track of elongated high-temperature high-activity periods.

Alternately or in addition, the utilization counter may include at least one wear-out counter that may measure the wear-out level of the processor core by monitoring the performance of devices or macros designed for this purpose. The utilization counter may further include at least one activity counter that monitors the level of operational activities, i.e., the number of operations in semiconductor devices, within the processor core.

Referring to step 230, computational demand for each of the threads in the processor cores are estimated based on the data collected from the processor cores during the temporary reassignment of the threads. Specifically, the computational demand for a particular thread that normally runs on a particular processor core is estimated while that thread is temporarily exchanged or temporarily transferred from that processor core. The removal of a thread with a computational demand that is higher than average computational demand of the rest of the threads on a processor core results in a reduction of temperature and improvement in the performance parameters affecting the utilization counter for the processor core. Thus, the temperature sensor on the processor core measures a reduced temperature and the utilization counter decreases, i.e., indicates a lesser usage level than average. Thus, the computational demand for each thread may be estimated by the data generated from the processor core while that thread is temporarily transferred out or temporarily exchanged out.

As a processor core heats up during operation of the multi-core semiconductor chip, the heat from one processor core spills over to neighboring processor core in all directions, including processor cores in the same cluster and different clusters. Unlike methods known in the art, a global thermal profile across the processor cores of a multi-core semiconductor chip in any particular thread configuration is not necessary because the threads may be re-assigned without generating a global thermal profile in the methods of an embodiment of the present invention.

Referring to step 240, the total computational demand of a processor core is estimated by adding up estimated computational demands of all threads in the processor core. The total computational demand of the processor core is compared with a threshold demand level of the processor core, which is a predefined level of computational demand in the processor chip that triggers significant degradation in performance, for example, through overheating of the multi-core semiconductor chip. Spilling thresholds are determined by extensive off-line simulations during chip design flow: varying from chip to chip, depending on the characteristics of the chip, cooling solution, number of active cores. For instance a partial good solution with few cores active does not have the same spilling thresholds as an all-good multi-core chip. Furthermore, the thresholds dynamically vary in time. This is in coordination with the Wear-out counters we've explained in the embodiments. If a core or cluster has been extensively used for an elongated amount of time, and has exhibited number of wear out indications, the spilling threshold is reduced effectively. The wear out indications are assessed based on data from NBTI sensors, ring oscillators, etc. Dynamic variation of thresholds is done to maximize the lifetime reliability as well as the thermal profile simultaneously.

The total computational demand may be computed employing the temperature sensor in the processor core because a processor core heats up more with an increase in the total computational demand. Alternately or in parallel, the total computational demand may be calculated employing the utilization counter in the processor core.

If the total computational demand of the processor core is less than the threshold demand level of the processor core, the processor core is operating in an optimal performance regime. The process flow continues to step 210 to continue to transfer or exchange threads with concurrent monitoring of the performance parameters as described above.

If the total computational demand of the processor core is greater than the threshold demand level of the processor core, the process flow proceeds to step 250, in which at least one thread with the highest computational demand is identified within the processor core. For example, if the temperature of a processor core reaches a predefined threshold temperature, at least one thread with the highest computational demand may be identified by comparing temperature variations in the processor core during the temporary thread transfers. Alternately, if the utilization index reaches a threshold, at least one thread with the highest computational demand may also be identified for subsequent migration within the cluster even if the processor core does not reach the predefined threshold temperature. The identification of the at least one processor core with the highest computational demand is effected by comparing the estimated computational demand for each thread in the processor core as obtained at step 230.

In case the process flow proceeds to step 250, the process flow further proceeds to step 260. At step 260, the thread with the highest computational demand is moved to another processor core in the cluster, or exchanged with another thread in another processor core in the cluster. The move or exchange of the thread with the highest computational demand is "permanent," i.e., performed without a subsequent pre-planned corresponding reverse exchange.

The processor core from which the thread with the highest computational demand is transferred subsequently runs without the transferred thread. This processor core may run with, or without, a new thread that is transferred from another processor core. Thus, the move or exchange of the thread with the highest computational demand is a permanent reassignment of threads. In some embodiments, more than one thread may be transferred during a permanent reassignment of threads based on the evaluation performed at step 240 and the selection of multiple high computational-demand threads, i.e., "hot" threads, at step 250.

Referring to step 270, the cluster control unit notifies the software manager of a new list of threads that runs in each processor core in the thread. The notification is a transfer of information from the cluster control unit to the software manager. The permanent reassignment of threads is performed by the cluster controller at the cluster level, and the result is notified to the software manager that tracks the threads passively throughout the multi-core semiconductor chip. In resolving a Conflict between the SW and HW decision algorithms, the proposed DTM solution prioritizes and flags these decisions to resolve conflicts. The outcome is based on which (HW or SW) has higher priority decision for thread migration. If the SW is basing the decision on a high-priority cause, it overwrites the HW decision and visa versa. If the HW decision is for power-thermal optimization only, it has moderate priority, i.e., it overwrites any SW decision with lower priority. An extreme case is observed in thermal emergency response, where the HW has ultimate priority on the chip since the heating has reached very high levels, thereby threatening functionality and integrity of the chip. In such a case—HW decision priority is 1, i.e., an absolute priority, and overwrites everything on SW side.

Thus, the temperature sensors and the utilization counters in each processor core are employed to balance the on-chip activity at the cluster level. For example, if a processor core is underutilized and another processor core is over-utilized, the permanent reassignment of threads by the cluster control unit balances the usage of the processor cores with this algorithm.

Figure 3:
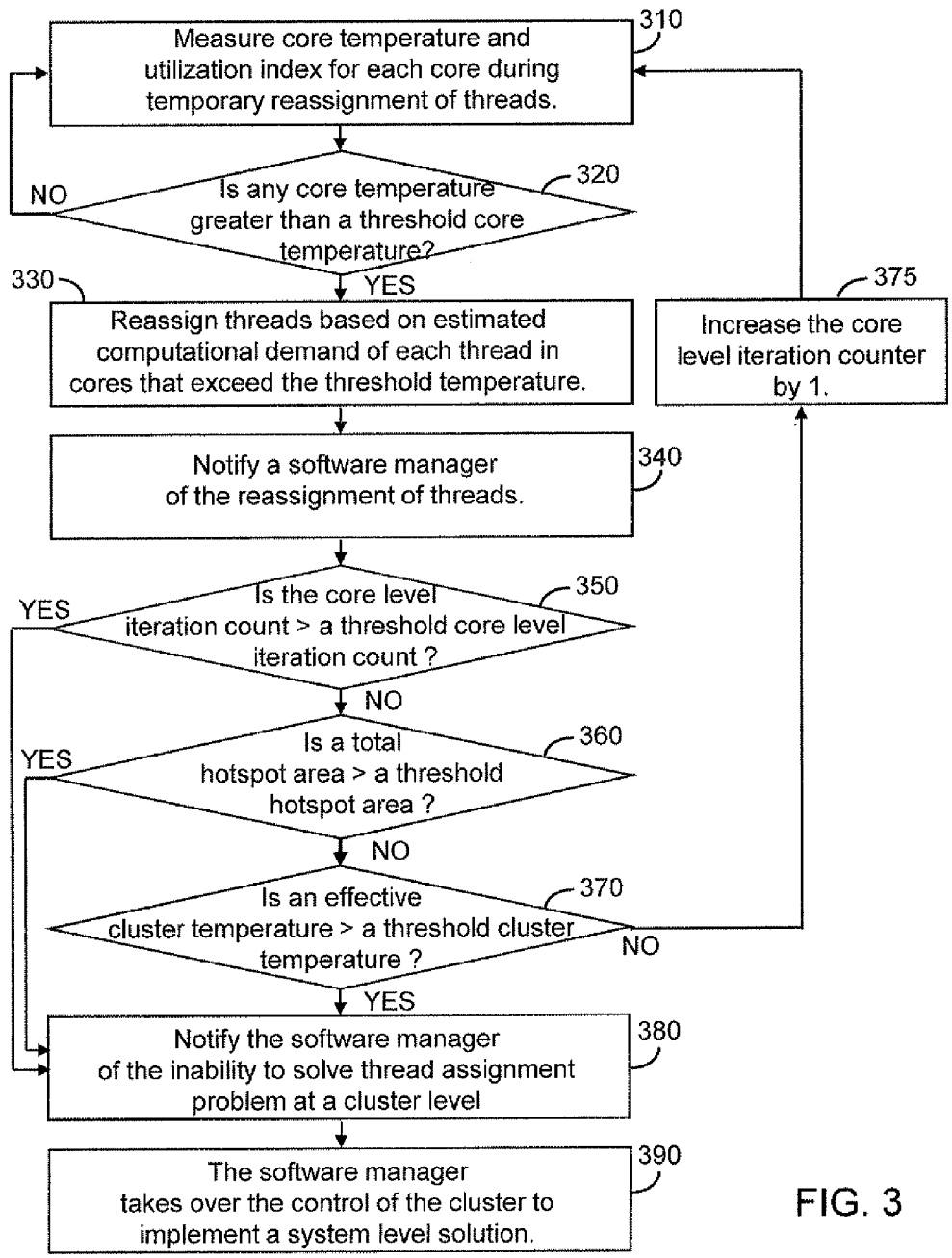
FIG. 3 is a second flow chart illustrating the steps of a second exemplary program executable by a cluster controller unit according to another embodiment of the present invention.

Referring to FIG. 3, a second flow chart illustrates the steps of a second exemplary program executable by a cluster controller unit according to another embodiment of the present invention. Like the first exemplary program, the second exemplary program may be performed in each cluster in a multi-core semiconductor chip.

Referring to step 310, a core temperature and a utilization index value are measured for each processor core in a cluster during sequential execution of performance of temporary reassignment of the threads as in the step 220 of the first exemplary program.

Referring to step 320, the core temperature of each processor core is compared with a predetermined threshold core temperature. The second exemplary program determines whether the temperature of each processor core exceeds the predetermined threshold core temperature during any of the temporary reassignment of the threads. If all temperatures of the respective processor cores within a cluster are less than the predetermined threshold core temperature, the process flow subsequently reiterates step 310 to continually monitor the core temperature and the utilization indices of the processor cores in the cluster. Without permanently transferring any of the threads in the cluster, the process flow continues to step 310, at which temporary reassignment of the threads is performed for continued monitoring of the processor cores in the cluster.

Referring to step 330, if the temperature of a processor core exceeds the predetermined threshold core temperature during any of the temporary reassignment of the threads, threads are re-assigned based on estimated computational demand of each thread in the processor core that has a temperature exceeding the predetermined threshold core temperature. For example, the thread reassignment may be performed as in step 260 in the first exemplary program. For example, if the temperature of a first processor core exceeds the predetermined threshold core temperature, a highest-computational-demand thread is determined among the threads in the first processor core, and is permanently transferred to another processor core or is permanently exchanged with another thread in another processor core within the cluster.

Referring to step 340, the thread re-assignment is notified to a software manager as in step 270 in the first exemplary program.

Subsequently, the second exemplary program may determine whether thread transfers from the first processor core are effective in reducing the temperature of the first processor core. The determination of the effectiveness of the thread transfers may be effected by monitoring a performance metric of each processor core, for example, by monitoring the temperature in the processor cores.

For example, the process flow may proceed to step 350, at which a total number of permanent thread transfers for each processor core, which is herein referred to as a core level iteration count, is compared with a threshold core level iteration count. If the core level iteration count exceeds the threshold core level iteration count, the probability of not being able to find an optimal thread assignment for that processor core through thread reassignment at the cluster level is significant. Thus, the process flow proceeds to step 380. If the core level iteration count does not exceed the threshold core level iteration count, attempts to optimize thread assignment for that processor core at the cluster level have not been exhausted. In this case, the process flow may proceed to step 360.

Referring to step 360, a total hotspot area within the cluster may be compared with a threshold hotspot area for the cluster. The threshold hotspot area for the cluster is the total area of hotspots, i.e., locations at which a processor core runs "hot" at an unacceptably high temperature. If the total hotspot area exceeds the threshold hotspot area for the cluster, the probability of not being able to find an optimal thread assignment for that processor core through thread reassignment at the cluster level is significant. Thus, the process flow proceeds to step 380. If the total hotspot area does not exceed the threshold hotspot area for the cluster, attempts to optimize thread assignment for that processor core at the cluster level have not been exhausted. In this case, the process flow may proceed to step 370.

Referring to step 370, an effective cluster temperature may be calculated from temperature measurement on all processor cores in the cluster. The effective cluster temperature may be compared with a threshold cluster temperature for the cluster. The threshold cluster temperature is the average temperature for the cluster above which the cluster is deemed to operate at an unacceptably low performance level. If the effective cluster temperature exceeds the threshold cluster temperature for the cluster, the probability of not being able to find an optimal thread assignment for that processor core through thread reassignment at the cluster level is significant. Thus, the process flow proceeds to step 380. If the effective cluster temperature does not exceed the threshold cluster temperature for the cluster, attempts to optimize thread assignment for that processor core at the cluster level have not been exhausted.

Additional criteria measuring the performance of the cluster may be introduced to determine whether a satisfactory thread reassignment may be reached at the cluster level or not. If the cluster control unit determines that optimization of threads is possible at the cluster level, the process flow proceeds to step 375, at which the core level iteration counter is incremented by 1 to record an increase in the number of attempts for a cluster level solution in the history of the thread management at the cluster level. The process flow then proceeds to step 310, at which temporary reassignment of the threads is performed for continued monitoring of the processor cores in the cluster and further optimization of thread assignment within the cluster by permanent thread reassignments.

Referring to step 380, the cluster control unit determines that cluster level thread optimization does not effectively reduce the temperature of the processor cores, the total hot spot area in the cluster, or the effective cluster temperature. The failure to control the temperature of the processor cores, i.e., the ineffectiveness of previously performed thread transfer within the cluster, is notified to a software manager that controls all clusters in the multi-core processor.

Referring to step 390, the software manager takes over the thread assignment task for the cluster to implement a system level solution for thread assignment. This may include overall slowdown of the cluster, exchange of threads in the cluster that failed to control the temperature of processor cores, i.e., "hot" cluster, with threads in anther cluster, or a temporary shutdown of the cluster.

Figure 4:
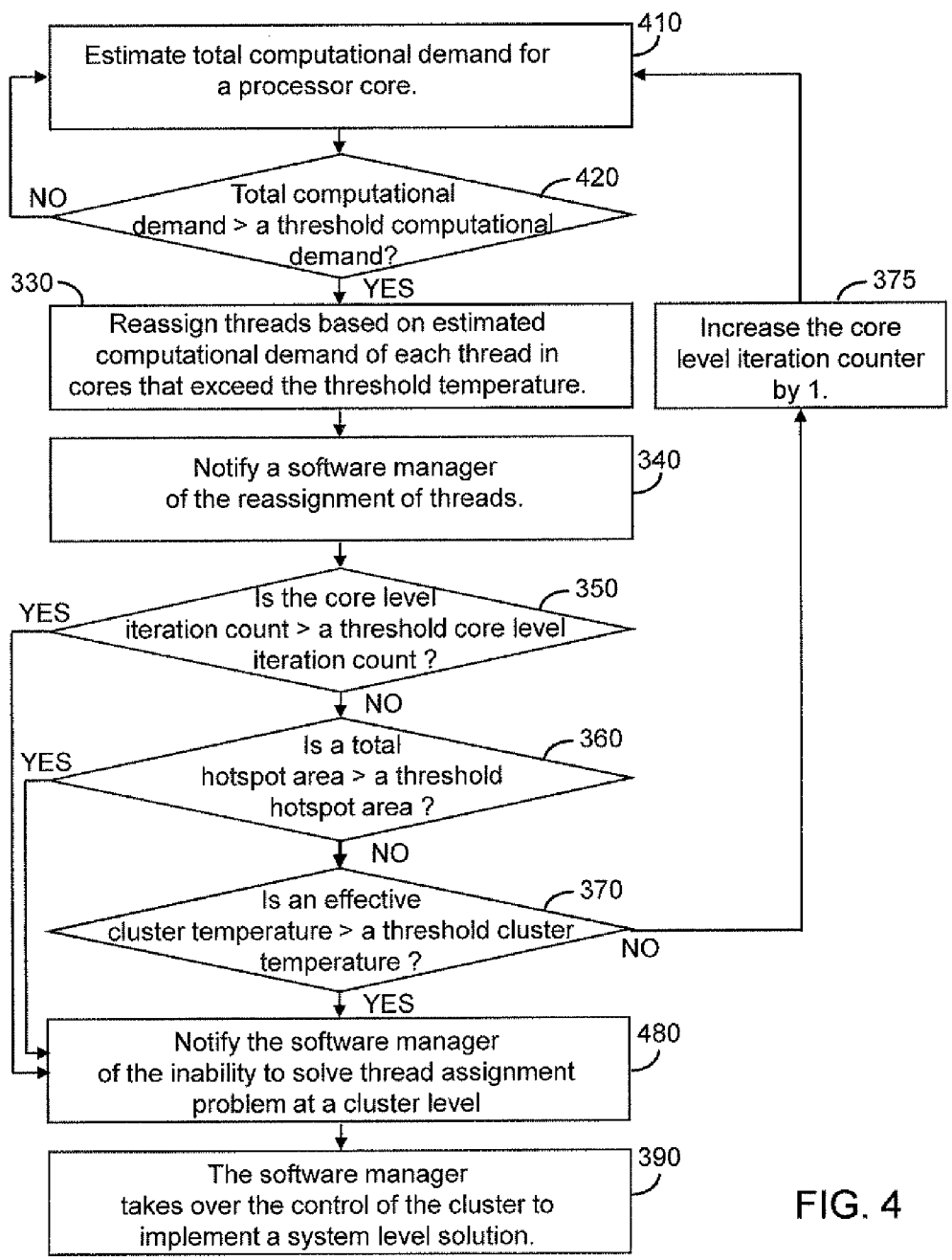
FIG. 4 is a third flow chart illustrating the steps of a third exemplary program executable by a cluster controller unit according to yet another embodiment of the present invention.

Referring to FIG. 4, a third flow chart illustrates the steps of a third exemplary program executable by a cluster controller unit according to yet another embodiment of the present invention. Like the first and second exemplary programs, the third exemplary program may be performed in each cluster in a multi-core semiconductor chip.

Referring to step 410, total computational demand is estimated for each processor core in a cluster during sequential execution of perform temporary reassignment of the threads as in the step 220 of the first exemplary program.

Referring to step 420, the total computational demand for each processor core is compared with a predetermined threshold computational demand. The third exemplary program determines whether the total computational demand in each processor core exceeds a predetermined threshold demand level for that processor core. If each of the total computational demands is less than the predetermined threshold demand level, the process flow subsequently reiterates step 410 to continually monitor the total computational demand for each processor core in the cluster. Without permanently transferring any of the threads in the cluster, the process flow continues to step 410, at which temporary reassignment of the threads is performed for continued monitoring of the processor cores in the cluster.

Referring to step 330, if the total computational demand in a processor core exceeds the predetermined threshold demand level during any of the temporary reassignment of the threads, threads are re-assigned based on estimated computations demand of each thread in the processor core that has a temperature exceeding the predetermined threshold core temperature as in the second exemplary program.

Steps 330, 340, 350, 360, 370, and 375 may be performed in the same manner as in the second exemplary program.

Referring to step 480, the cluster control unit determines that cluster level thread optimization does not effectively reduce the total computational demand in a processor core, the total hot spot area in the cluster, or the effective cluster temperature. The failure to control the total computational demand, i.e., the ineffectiveness of previously performed thread transfer within the cluster, is notified to a software manager that controls all clusters in the multi-core processor. The process flow proceeds to step 390, which is the same as performed in the second exemplary program.

In the exemplary programs described above, the software manager does not keep track of the identity of individual threads. Instead, the location of each thread is tracked at the cluster level by the cluster control units. The cluster control units thus operate autonomously without the control by the software manager until it becomes necessary to report a permanent transfer or exchange of threads within the cluster, for example, at step 270 in FIG. 2 or step 340 in FIGS. 3 and 4, or until it becomes necessary to report the inability to optimize thread assignment at the cluster level, for example, at step 380 or step 480.

While the present invention has been particularly shown and described with respect to preferred embodiments thereof, it will be understood by those skilled in the art that the foregoing and other changes in forms and details may be made without departing from the spirit and scope of the present invention. For example, variations that combine various steps of the first, second, and third exemplary programs in a single program may be employed. It is therefore intended that the present invention not be limited to the exact forms and details described and illustrated, but fall within the scope of the appended claims.

What is claimed is:

1. A multi-core processor chip including at least one cluster of processor cores, wherein each of said at least one cluster includes a plurality of processor cores and a cluster controller unit that is configured to perform program instructions, wherein said cluster controller unit comprises a finite state machine (FSM) and a cluster table, said FSM embodied in a hardware component including memory modules and at least one processor and representing a state of said at least one cluster as one among a finite number of states that characterizes all possible states of said at least one cluster, and said cluster table identifying and keeping track of thread numbers that identify each thread being run within each processor core for all threads within said at least one cluster, and wherein said program instructions configure said controller unit to perform the steps of:

determining threads running in a first processor core within a cluster;

performing temporary reassignment of each of said threads in said first processor core to a second processor core within said cluster while said cluster controller unit keeps track of each temporary reassignment by making corresponding changes to said FSM;

during each of said temporary reassignment of said threads, generating data relating to core performance in said first processor core; and estimating computational demand for each of said threads in said first processor core based on said data relating to core performance.

2. The multi-core processor chip of claim 1, wherein said program instructions further configure said controller unit to perform the steps of:

transferring one of said threads to another processor core based on said estimated computational demand; and transmitting information on transfer of said one of said threads to a software manager that controls all clusters in said multi-core processor.

3. The multi-core processor chip of claim 1, wherein each processor core in said cluster includes at least one temperature sensor and at least one utilization counter, wherein said data relating to core performance includes temperature of said first processor core and a value for each of said at least one utilization counter for said first processor core, wherein said temperature of said first processor core is measured employing said at least one temperature sensor, and wherein said value for each of said at least one utilization counter is generated by said at least one utilization counter.

4. The multi-core processor chip of claim 3, wherein said at least one utilization counter includes at least one of a ring-oscillator sensor that determines a signal propagation speed in a ring oscillator circuit and a negative-bias temperature instability (NBTI) sensor that measures a shift in threshold voltage in transistors.

5. The multi-core processor chip of claim 1, wherein said program instructions further configure said controller unit to perform the step of determining whether temperature of said first processor core exceeds a predetermined threshold core temperature during any of said temporary reassignment of said threads.

6. The multi-core processor chip of claim 5, wherein said program instructions further configure said controller unit to perform the steps of:

if said temperature of said first processor core exceeds said predetermined threshold core temperature, determining a highest-computational-demand thread among said threads in said first processor core and permanently transferring said highest-computational-demand thread to another processor core; and if said temperature of said first processor core does not exceed said predetermined threshold core temperature, continuing to sequentially perform temporary reassignment of said threads without transferring any of said threads.

7. The multi-core processor chip of claim 6, wherein said program instructions further configure said controller unit to perform the steps of:

determining whether thread transfers from said first processor core is effective in reducing said temperature of said first processor core by monitoring at least one of a total number of permanent thread transfers from said first processor, a total hotspot area within said cluster, and an effective cluster temperature that is calculated from temperature measurement on all processor cores in said cluster; and if said thread transfers from said first processor core are determined to be not effective in reducing said temperature of said first processor core, notifying ineffectiveness of said thread transfers to a software manager that controls all clusters in said multi-core processor.

8. The multi-core processor chip of claim 5, wherein said program instructions further configure said controller unit to perform the steps of:
if said temperature of said first processor core exceeds said predetermined threshold core temperature, determining a highest-computational-demand thread among said threads in said first processor core and permanently exchanging said highest-computational-demand thread with another thread in another processor core within said cluster; and
if said temperature of said first processor core does not exceed said predetermined threshold core temperature, continuing to sequentially perform temporary reassignment of said threads without transferring any of said threads.

9. The multi-core processor chip of claim 1, wherein said program instructions further configure said controller unit to perform the step of determining whether a total computational demand of said threads in said first processor core exceeds a predetermined threshold demand level for said first processor.

10. The multi-core processor chip of claim 9, wherein said program instructions further configure said controller unit to perform the steps of:
if said total computational demand of said threads exceeds said predetermined threshold demand level, determining a highest-computational-demand thread among said threads in said first processor core and permanently transferring said highest-computational-demand thread to another processor core; and
if said total computational demand of said threads does not exceed said predetermined threshold demand level, continuing to sequentially perform temporary reassignment of said threads without transferring any of said threads.

11. The multi-core processor chip of claim 9, wherein said program instructions further configure said controller unit to perform the steps of:
if said total computational demand of said threads exceeds said predetermined threshold demand level, determining a highest-computational-demand thread among said threads in said first processor core and permanently exchanging said highest-computational-demand thread with another thread in another processor core within said cluster; and
if said total computational demand of said threads does not exceed said predetermined threshold demand level, continuing to sequentially perform temporary reassignment of said threads without transferring any of said threads.

12. The multi-core processor chip of claim 1, wherein said multi-core processor chip is configured to transmit information regarding a location of each thread to a software-level resource manager that keeps track of the contents of each thread in said at least one cluster.

13. A method of operating a multi-core processor chip including at least one cluster of processor cores, wherein each of said at least one cluster includes a plurality of processor cores and a cluster controller unit, wherein said cluster controller unit comprises a finite state machine (FSM) and a cluster table, said FSM embodied in a hardware component including memory modules and at least one processor and representing a state of said at least one cluster as one among a finite number of states that characterizes all possible states of said at least one cluster, and said cluster table identifying and keeping track of thread numbers that identify each thread being run within each processor core for all threads within said at least one cluster, said method comprising:
determining threads running in a first processor core within a cluster;
performing temporary reassignment of each of said threads in said first processor core to a second processor core within said cluster while said cluster controller unit keeps track of each temporary reassignment by making corresponding changes to said FSM;
during each of said temporary reassignment of said threads, generating data relating to core performance in said first processor core; and
estimating computational demand for each of said threads in said first processor core based on said data relating to core performance.

14. The method of claim 13, further comprising:
transferring one of said threads to another processor core based on said estimated computational demand; and
transmitting information on transfer of said one of said threads to a software manager that controls all clusters in said multi-core processor.

15. The method of claim 13, wherein each processor core in said cluster includes at least one temperature sensor and at least one utilization counter, wherein said data relating to core performance includes temperature of said first processor core and a value for each of said at least one utilization counter for said first processor core, and wherein said method further comprises:
measuring said temperature of said first processor core employing said at least one temperature sensor; and
generating said value for each of said at least one utilization counter employing said at least one utilization counter.

16. The method of claim 15, wherein said at least one utilization counter includes at least one of a ring-oscillator sensor and a negative-bias temperature instability (NBTI) sensor, and wherein said method further comprises determining a signal propagation speed in a ring oscillator circuit employing said at least one of a ring-oscillator sensor or measuring a shift in threshold voltage in transistors by employing said negative-bias temperature instability (NBTI) sensor.

17. The method of claim 13, further comprising determining whether temperature of said first processor core exceeds a predetermined threshold core temperature during any of said temporary reassignment of said threads.

18. The method of claim 17, further comprising:
if said temperature of said first processor core exceeds said predetermined threshold core temperature, determining a highest-computational-demand thread among said threads in said first processor core and permanently transferring said highest-computational-demand thread to another processor core; and
if said temperature of said first processor core does not exceed said predetermined threshold core temperature, continuing to sequentially perform temporary reassignment of said threads without transferring any of said threads.

19. The method of claim 18, further comprising:
determining whether thread transfers from said first processor core is effective in reducing said temperature of said first processor core by monitoring at least one of a total number of permanent thread transfers from said first processor, a total hotspot area within said cluster, and an effective cluster temperature that is calculated from temperature measurement on all processor cores in said cluster; and if said thread transfers from said first processor core is determined to be not effective in reducing said temperature of said first processor core, notifying ineffectiveness of said thread transfer to a software manager that controls all clusters in said multi-core processor.

20. The method of claim 17, further comprising:
if said temperature of said first processor core exceeds said predetermined threshold core temperature, determining a highest-computational-demand thread among said threads in said first processor core and permanently exchanging said highest-computational-demand thread with another thread in another processor core within said cluster; and
if said temperature of said first processor core does not exceed said predetermined threshold core temperature, continuing to sequentially perform temporary reassignment of said threads without transferring any of said threads.

21. The method of claim 13, further comprising determining whether a total computational demand of said threads in said first processor core exceeds a predetermined threshold demand level for said first processor.

22. The method of claim 21, further comprising:
if said total computational demand of said threads exceeds said predetermined threshold demand level, determining a highest-computational-demand thread among said threads in said first processor core and permanently transferring said highest-computational-demand thread to another processor core; and
if said total computational demand of said threads does not exceed said predetermined threshold demand level, continuing to sequentially perform temporary reassignment of said threads without transferring any of said threads.

23. The method of claim 21, further comprising:
if said total computational demand of said threads exceeds said predetermined threshold demand level, determining a highest-computational-demand thread among said threads in said first processor core and permanently exchanging said highest-computational-demand thread with another thread in another processor core within said cluster; and
if said total computational demand of said threads does not exceed said predetermined threshold demand level, continuing to sequentially perform temporary reassignment of said threads without transferring any of said threads.

24. The method of claim 13, further comprising transmitting information regarding a location of each thread from said multi-core processor chip to a software-level resource manager that keeps track of the contents of each thread in said at least one cluster.

* * * * *